United States Patent
Al-Harthi et al.

(10) Patent No.: US 10,150,850 B2
(45) Date of Patent: Dec. 11, 2018

(54) HIGH-DENSITY POLYETHYLENE-GRAPHENE NANOCOMPOSITES AND METHODS THEREOF

(71) Applicant: KING FAHD UNIVERSITY OF PETROLEUM AND MINERALS, Dhahran (SA)

(72) Inventors: Mamdouh Ahmad Al-Harthi, Dhahran (SA); Farrukh Shehzad, Dhahran (SA); Sadhan Kumar De, Kolkata (IN)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 140 days.

(21) Appl. No.: 15/374,445

(22) Filed: Dec. 9, 2016

(65) Prior Publication Data

US 2017/0137596 A1    May 18, 2017

Related U.S. Application Data

(62) Division of application No. 14/533,698, filed on Nov. 5, 2014, now abandoned.

(51) Int. Cl.
*C08K 3/04*         (2006.01)

(52) U.S. Cl.
CPC ............... *C08K 3/04* (2013.01); *C08K 3/042* (2017.05); *C08K 2201/011* (2013.01)

(58) Field of Classification Search
CPC .... C08K 3/04; C08K 2201/011; C08K 3/042; C08L 23/06; C08F 110/02; C08F 2/44

USPC ........................................................ 524/495
See application file for complete search history.

(56) References Cited

U.S. PATENT DOCUMENTS 7,829,622 B2 *  11/2010  McDaniel .............. B82Y 30/00
                                                       524/496
2014/0224466 A1    8/2014  Lin

FOREIGN PATENT DOCUMENTS

CN         102731880 A      10/2012
CN         103172772 A       6/2013
CN         103588915 A       2/2014
WO    WO 2013/053944 A1     4/2013

OTHER PUBLICATIONS

Fabiana de C. Fim, et al., Thermal, Electrical, and Mechanical Properties of Polyethylene-Graphene Nanocomposites Obtained by In Situ Polymerization, Journal of Applied Polymer Science, vol. 128, Issue 5, Jun. 2013, pp. 2630-2637 (published online Aug. 23, 2012).

(Continued)

*Primary Examiner* — Josephine L Chang
(74) *Attorney, Agent, or Firm* — Oblon, McClelland, Maier & Neustadt, L.L.P.

(57) ABSTRACT

Methods of preparing high-density polyethylene (HDPE) nanocomposites by in situ polymerization with a metallocene catalyst and a methylaluminoxane co-catalyst in a solvent. The HDPE nanocomposites contain graphene nanofillers that promote the polymerization process, and are found to enhance the molecular weight, molecular weight distribution and flame retardency of the HDPE nanocomposites produced.

14 Claims, 1 Drawing Sheet

(56) References Cited

OTHER PUBLICATIONS

Farrukh Shehzad, et al., Non-isothermal crystallization kinetics of high density polyethylene/graphene nanocomposites prepared by in-situ polymerization, http://www.sciencedirect.com/science/article/pii/S004060311400239, Aug. 10, 2014, pp. 1-2.

Fabiana de C. Fim, Polyethylene/graphite nanocomposites obtained by in situ polymerization, Journal of Polymer Science Part A: Polymer Chemistry, vol. 48, Issue 3, Dec. 22, 2009, pp. 1-3, Abstract Only.

Benham, et al., "Polyethylene, High Dentsity", Kirk-Othmer Encyclopedia of Chemical Technology, John Wiley & Sons, Inc. (2005).

\* cited by examiner

US 10,150,850 B2

HIGH-DENSITY POLYETHYLENE-GRAPHENE NANOCOMPOSITES AND METHODS THEREOF

CROSS-REFERENCE TO RELATED APPLICATIONS

The present application is a divisional application of Ser. No. 14/533,698, filed Nov. 5, 2014, and incorporated herein by reference in its entirety.

TECHNICAL FIELD

The present invention relates to polyethylene nanocomposites, specifically high-density polyethylene nanocomposites containing graphene nanofillers and methods of preparing the high-density polyethylene nanocomposites.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Polyolefins such as high-density polyethylene (HDPE) are thermoplastics made from petroleum derived hydrocarbons. Known for its large strength density ratio and resistance to many different solvents, HDPE is used in a wide variety of applications including, for example, swimming pool installation, 3-D printer filament, backpacking frames, ballistic plates, banners, bottle caps, chemical resistant pipe systems, coax cable inner insulator, food storage containers, fuel tanks for vehicles, corrosion protection for steel pipelines, electrical and plumbing boxes, far-infrared lenses, folding chairs and tables, geomembrane for hydraulic applications (e.g. canals and bank reinforcements) and chemical containment, geothermal heat transfer piping systems, heat-resistant fireworks mortars, hard hats, hula hoops, last for shoes, natural gas distribution pipe systems, fireworks, plastic bags, plastic bottles suitable for both recycling or reuse, plastic lumber, plastic surgery (i.e. skeletal and facial reconstruction), root barrier, snowboard rails and boxes, stone paper, storage sheds, telecom ducts, flashspun HDPE fibers (e.g. Tyvek), water pipes for domestic water supply and agricultural processes, wood plastic composites and cell liners in sanitary landfills.

The versatile field of catalysis and polymer synthesis methodologies have led to production of a multitude of polyolefins with specific characteristics and practical application (W. Kaminsky, Trends in Polyolefin Chemistry, Macromol. Chem. Phys. 209 (2008) 459-466—incorporated herein by reference in its entirety). Polyolefins are one of the fastest growing classes of thermoplastics due to their good balance of physical and chemical properties, low-cost, lightweight, favorable processing and recycling characteristics. Catalysts used in the polymerization olefins include, for example, the heterogenous Ziegler-Natta catalysts and metallocene catalysts.

Metallocenes are a class of compounds typically containing of two cyclopentadienyl anions (Cp, which is $C_5H_5^-$) bound sandwich style to a metal center (M) in the oxidation state II, resulting in a general formula of $(C_5R_5)_2M$. A metallocene may also be an anion or cation depending on the oxidation state of the metal. Certain metallocenes and their derivatives exhibit catalytic properties.

In polyolefin synthesis, the metallocene catalysts allow the designing of polymer chain structure at a molecular level. In comparison with Ziegler-Natta catalysts which are also often used in the synthesis of polyolefins, metallocene catalysts are capable of structural variations. For instance, metallocene catalysts can be modified by substitution on and around cyclopentadienyl ligand and its analogues (D. Yan, W.-J. Wang, S. Zhu, Effect of long chain branching on rheological properties of metallocene polyethylene, Polymer (Guild). 40 (1999) 1737-1744—incorporated herein by reference in its entirety). Along with room for structural variations, metallocenes are able to produce copolymers of ethene or propene with other α-olefins (W. Kaminsky, Trends in Polyolefin Chemistry, Macromol. Chem. Phys. 209 (2008) 459-466—incorporated herein by reference in its entirety).

Polyolefin nanocomposites are an emerging field of interest in the polyolefin industry due to their potential in addressing the shortcomings of conventional polyolefins such as being poor gas barrier properties in packaging applications, dimensional and thermal stability limits in automotive applications and the like. Polyolefin nanocomposites are plastics containing low levels of dispersed nanomaterials or nanofillers having at least one dimension in the nanometer range. As a result of the dispersed nanomaterials, these polyolefin nanocomposites possess improved properties compared to conventional polyolefins, for example, better mechanical strength, chemical resistance, flame retardency and gas barrier properties. Such enhanced characteristics may depend on the nature, dispersion and bonding of the nanofillers in the polymer matrix (W. Kaminsky, Trends in Polyolefin Chemistry, Macromol. Chem. Phys. 209 (2008) 459-466; H. G. Jeon, H.-T. Jung, S. W. Lee, S. D. Hudson, Morphology of polymer/silicate nanocomposites, Polym. Bull. 41 (1998) 107-113; F. Yang, Flammability of Polymer-Clay and Polymer-Silica Nanocomposites, J. Fire Sci. 23 (2005) 209-226; B. C. Peoples, In Situ Production of Polyolefin-clay Nanocomposites, ProQuest, 2008; D. Ma, T. A. Hugener, R. W. Siegel, A. Christerson, E. Mårtensson, C. Önneby, et al., Influence of nanoparticle surface modification on the electrical behaviour of polyethylene nanocomposites, Nanotechnology. 16 (2005) 724-731; O. Bin Sohail, M. Jabarullah Khan, P. A. Sreekumar, M. A. Al-Harthi, Effect of ceramic nanofiller silicon nitride on polyethylene productivity and properties, Polym. Eng. Sci. (2013); O. Bin Sohail, P. A. Sreekumar, S. K. De, M. Jabarullah Khan, A. Hakeem, A. A. Alshaiban, et al., Thermal Effect of Ceramic Nanofiller Aluminium Nitride on Polyethylene Properties, J. Nanomater. 2012 (2012) 1-7; P. J. Dionne, R. Ozisik, C. R. Picu, Structure and Dynamics of Polyethylene Nanocomposites, Macromolecules. 38 (2005) 9351-9358; P. A. Zapata, C. Belver, R. Quijada, P. Aranda, E. Ruiz-Hitzky, Silica/clay organo-heterostructures to promote polyethylene-clay nanocomposites by in situ polymerization, Appl. Catal. A Gen. 453 (2013) 142-150; P. A. Zapata, L. Tamayo, M. Páez, E. Cerda, I. Azécar, F. M. Rabagliati, Nanocomposites based on polyethylene and nanosilver particles produced by metallocenic "in situ" polymerization: synthesis, characterization, and antimicrobial behavior, Eur. Polym. J. 47 (2011) 1541-1549; Y. Peneva, E. Tashev, L. Minkova, Flammability, microhardness and transparency of nanocomposites based on functionalized polyethylenes, Eur. Polym. J. 42 (2006) 2228-2235; S.-P. Liu, Flame retardant and mechanical properties of polyethylene/magnesium hydroxide/montmorillonite nanocomposites, J. Ind. Eng. Chem.

(2013); N. M. Ushakov, G. Y. Yurkov, L. V. Gorobinskii, O. V. Popkov, I. D. Kosobudskii, Nanocomposites based on the cerium oxide nanoparticles and polyethylene matrix: Syntheses and properties, Acta Mater. 56 (2008) 2336-2343—each incorporated herein by reference in its entirety).

Among the family of nanofillers, carbon-based nanofillers such as carbon nanotubes (CNTs) and graphene are of special interest. These nanofillers have remarkable characteristics such as ultra-high mechanical strength, electrical conductivity, high surface area, gas barrier properties and chemical functionalization capability. Graphene and CNT based nanocomposites have been successfully synthesized with improved characteristics (Chinese Patents CN103588915A; CN103172772A; F. D. C. Fim, N. R. S. Basso, A. P. Graebin, D. S. Azambuja, G. B. Galland, Thermal, electrical, and mechanical properties of polyethylene-graphene nanocomposites obtained by in situ polymerization, Journal of Applied Polymer Science. 128 (2012) 2630-2637; F. Shehzad, S. P. Thomas, M. A. Al-Harthi, Non-isothermal crystallization kinetics of high density polyethylene/graphene nanocomposites prepared by in-situ polymerization, Thermochimica Acta. 589 (2014) 226-234—each expressly incorporated herein by reference in its entirety; R. Haggenmueller, J. E. Fischer, K. I. Winey, Single Wall Carbon Nanotube/Polyethylene Nanocomposites: Nucleating and Templating Polyethylene Crystallites, Macromolecules. 39 (2006) 2964-2971; R. Haggenmueller, C. Guthy, J. R. Lukes, J. E. Fischer, K. I. Winey, Single Wall Carbon Nanotube/Polyethylene Nanocomposites: Thermal and Electrical Conductivity, Macromolecules. 40 (2007) 2417-2421; Z. Liu, M. Yu, J. Wang, F. Li, L. Cheng, J. Guo, et al., Preparation and characterization of novel polyethylene/carbon nanotubes nanocomposites with core—shell structure, J. Ind. Eng. Chem. (2013); S. Li, H. U. I. Chen, W. Bi, J. Zhou, Y. Wang, J. Li, et al., Synthesis and Characterization of Polyethylene Chains Grafted onto the Sidewalls of Single-Walled Carbon Nanotubes via Copolymerization, J. Polym. Sci. Part A Polym. Chem. 45 (2007) 5459-5469; J. Du, H.-M. Cheng, The Fabrication, Properties, and Uses of Graphene/Polymer Composites, Macromol. Chem. Phys. 213 (2012) 1060-1077; H. Kim, C. W. Macosko, Morphology and Properties of Polyester/Exfoliated Graphite Nanocomposites, Macromolecules. 41 (2008) 3317-3327; F. D. C. Fim, N. R. S. Basso, A. P. Graebin, D. S. Azambuja, G. B. Galland, Thermal, electrical, and mechanical properties of polyethylene-graphene nanocomposites obtained by in situ polymerization, J. Appl. Polym. Sci. 128 (2013) 2630-2637; R. Verdejo, M. M. Bernal, L. J. Romasanta, M. A. Lopez-Manchado, Graphene filled polymer nanocomposites, J. Mater. Chem. 21 (2011) 3301; D. Zhuo, R. Wang, L. Wu, Y. Guo, L. Ma, Z. Weng, et al., Flame Retardancy Effects of Graphene Nanoplatelet/Carbon Nanotube Hybrid Membranes on Carbon Fiber Reinforced Epoxy Composites, J. Nanomater. 2013 (2013); G. Eda, M. Chhowalla, Graphene-based composite thin films for electronics., Nano Lett. 9 (2009) 814-8; H. Kim, S. Kobayashi, M. A. AbdurRahim, M. J. Zhang, A. Khusainova, M. A. Hillmyer, et al., Graphene/polyethylene nanocomposites: Effect of polyethylene functionalization and blending methods, Polymer (Guildf). 52 (2011) 1837-1846; T. Kuilla, S. Bhadra, D. Yao, N. H. Kim, S. Bose, J. H. Lee, Recent advances in graphene based polymer composites, Prog. Polym. Sci. 35 (2010) 1350-137—each incorporated herein by reference in its entirety).

Synthesis of polyolefin nanocomposites can be carried out by three main methods, namely solution mixing, melt blending and in situ polymerization. Among the three methods, in situ polymerization has the advantage of homogeneous dispersion of the filler, therefore making it relatively easy to study the effect of the filler on the activity and chemistry of the catalyst (F. D. C. Fim, N. R. S. Basso, A. P. Graebin, D. S. Azambuja, G. B. Galland, Thermal, electrical, and mechanical properties of polyethylene-graphene nanocomposites obtained by in situ polymerization, J. Appl. Polym. Sci. 128 (2013) 2630-2637; R. Verdejo, M. M. Bernal, L. J. Romasanta, M. A. Lopez-Manchado, Graphene filled polymer nanocomposites, J. Mater. Chem. 21 (2011) 3301—each incorporated herein by reference in its entirety).

Properties desired in polyolefin nanocomposites such as enchanced mechanical properties and environmental stress cracking resistance can be obtained through high molecular weight of the polyolefin in the composites. However, high molecular weight polymers are difficult to process due to high melt viscosity. Therefore, in order to overcome this challenge, these high molecular weight polymers should also possess a high molecular weight distribution (D. Yan, W.-J. Wang, S. Zhu, Effect of long chain branching on rheological properties of metallocene polyethylene, Polymer (Guildf). 40 (1999) 1737-1744; T. K. Han, H. K. Choia, D. W. Jeungb, Y. S. Ko, Control of molecular weight and molecular weight distribution in ethylene polymerization with metallocene catalysts, Macromol. Chem. Phys. 196 (1995) 2637-2647—each incorporated herein by reference in its entirety).

Different techniques may be used to control the molecular weight and molecular weight distribution of polyolefins, for example, introducing long chain branching (LCB), use of nanofillers via in situ polymerization and crosslinking agents (D. Yan, W.-J. Wang, S. Zhu, Effect of long chain branching on rheological properties of metallocene polyethylene, Polymer (Guildf). 40 (1999) 1737-1744; S. Park, S. W. Yoon, K.-B. Lee, D. J. Kim, Y. H. Jung, Y. Do, et al., Carbon Nanotubes as a Ligand in Cp2ZrCl2-Based Ethylene Polymerization, Macromol. Rapid Commun. 27 (2006) 47-50; E. Saldivar-Guerra, E. Vivaldo-Lima, Handbook of Polymer Synthesis, Characterization, and Processing (Google eBook), John Wiley & Sons, 2013; M. Stürzel, F. Kempe, Y. Thomann, S. Mark, M. Enders, R. Mülhaupt, Novel Graphene UHMWPE Nanocomposites Prepared by Polymerization Filling Using Single-Site Catalysts Supported on Functionalized Graphene Nanosheet Dispersions, Macromolecules. 45 (2012) 6878-6887—each incorporated herein by reference in its entirety).

Similarly, the steric effect of graphene and CNTs can be utilized to tune the molecular weight, molecular weight distribution and catalytic activity of a single-site catalyst. For example, Park et al. used multiwall CNTs adsorbed with zirconocene to synthesize high molecular weight polyethylene with high molecular weight distribution. The increase in molecular weight was attributed to electronic and steric effect of multiwall CNTs (S. Park, S. W. Yoon, K.-B. Lee, D. J. Kim, Y. H. Jung, Y. Do, et al., Carbon Nanotubes as a Ligand in Cp2ZrCl2-Based Ethylene Polymerization, Macromol. Rapid Commun. 27 (2006) 47-50—incorporated herein by reference in its entirety). Stürzel et al. prepared ultra-high molecular weight PE by using functionalized graphene as a support for single site chromium catalyst (M. Stürzel, F. Kempe, Y. Thomann, S. Mark, M. Enders, R. Mülhaupt, Novel Graphene UHMWPE Nanocomposites Prepared by Polymerization Filling Using Single-Site Catalysts Supported on Functionalized Graphene Nanosheet Dispersions, Macromolecules. 45 (2012) 6878-6887—incorporated herein by reference in its entirety).

The above-described conventional techniques for making nanocomposites are unable to meet the changing requirements of the industry. Accordingly, the objective of the present invention is to provide novel methods or processes of preparing polyolefin nanocompositess with improved characteristics such as high molecular weight, high molecular weight distribution and high flame retardency.

BRIEF SUMMARY OF THE INVENTION

According to a first aspect, the present invention relates to a method of producing a high-density polyethylene nanocomposite, comprising polymerizing ethylene in a polymerization mixture comprising a metallocene catalyst, a methylaluminoxane co-catalyst and a graphene nanofiller to form a polyethylene nanocomposite.

In one embodiment, the graphene nanofiller is dispersed in the polyethylene matrix.

In one embodiment, the graphene nanofiller is not chemically modified.

In one embodiment, the amount of graphene nanofillers present during the polymerizing is 0.14-0.85 wt. % based on the total weight of the high-density polyethylene nanocomposite produced.

In one embodiment, the metallocene catalyst comprises zirconocene.

In one embodiment, the polymerizing is carried out in a solvent.

In another embodiment, the polymerizing is carried out in gas phase.

In one embodiment, the polymerizing forms a high-density polyethylene nanocomposite having a molecular weight of 30-120 kDa.

In one embodiment, the polymerizing forms a high-density polyethylene nanocomposite having a polydispersity index of 3-12.

In one embodiment, the polymerizing forms a high-density polyethylene nanocomposite that is non-flammable.

In one embodiment, the polymerizing is carried out at atmospheric pressure.

According to a second aspect, the present invention relates to a high-density polyethylene nanocomposite, comprising a polyethylene matrix and a graphene nanofiller dispersed therein.

In one embodiment, the polyethylene nanocomposite has a molecular weight of 30-120 kDa and a polydispersity index of 3-12.

In one embodiment, the graphene nanofiller is not chemically modified.

In one embodiment, the graphene nanofiller is present in an amount of 0.14-0.85 wt. % based on the total weight of the high-density polyethylene nanocomposite.

In one embodiment, the polyethylene nanocomposite further comprises zirconium.

In one embodiment, the high-density polyethylene nanocomposite is non-flammable.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
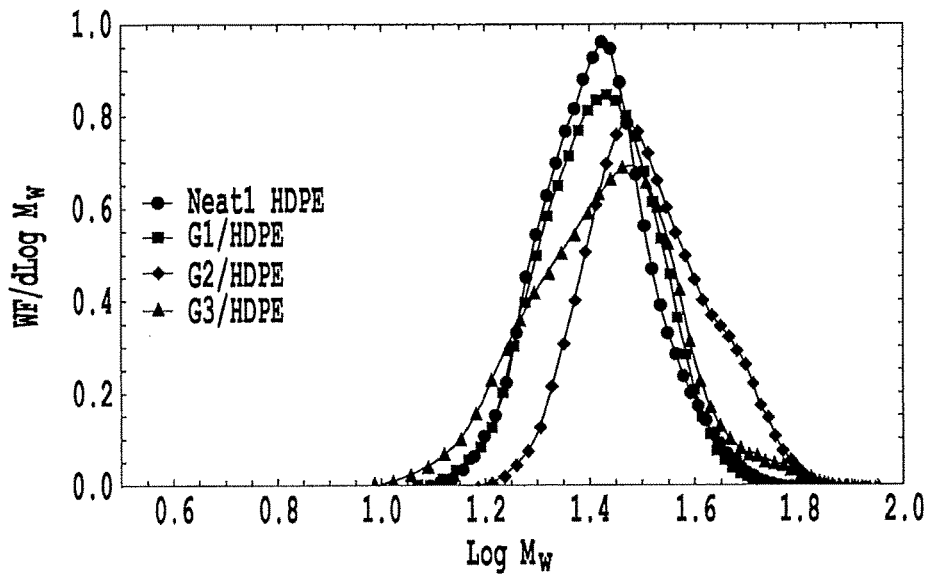
FIG. 1 is a graph illustrating the differential molecular weight distributions of polyethylene nanocomposites measured by high temperature gel permeation chromatography.

Referring now to the drawings, wherein like reference numerals designate identical or corresponding parts throughout the several views.

The present invention pertains to methods of preparing high-density polyethylene (HDPE) nanocomposites. The HDPE nanocomposites are prepared by in situ polymerization technique in a solvent (e.g. toluene) with a metallocene catalyst and a methylaluminoxane (MAO) co-catalyst. Furthermore, graphene nanofillers or graphene nanosheets are present as promoters to ethylene polymerization.

For purposes of the present invention, high-density polyethylene (HDPE) or polyethylene high-density (PEHD) refers to a polyethylene thermoplastic made from petroleum derived hydrocarbons. In a preferred embodiment, the hydrocarbon feedstock is ethylene. In one embodiment, the feedstock may contain other light olefins such as propylene and butadiene, preferably no more than 0.005 wt. %, preferably less than 0.002%, even more preferably less than 0.001%. In another embodiment, the polymerizing includes one or two more comonomers such as light olefins, diolefins, oligomers and/or alpha olefins.

As used herein, HDPE nanocomposites contain dispersed nanomaterials or nanofillers having at least one dimension in the nanometer range. Nanoparticle reinforcement can substantially improve HDPE properties such as mechanical strength, molecular weight, molecular distribution, gas barrier properties and flame retardancy.

The density of the HDPE nanocomposites synthesized with the methods according to the present invention can range from 0.93-0.99 $g/cm^3$, preferably 0.95-0.99 $g/cm^3$, more preferably 0.97-0.99 $g/cm^3$.

In one embodiment, the metallocene catalyst for the in situ, slurry polymerization of ethylene to produce HDPE is any one of the following: zirconocene dichloride, titanocene dichloride, vanadocene dichloride and derivatives thereof. In a preferred embodiment, the metallocene catalyst is zirconocene dichloride. Metallocenes by themselves are not typically active for polymerization. A co-catalyst such as methylaluminoxane (MAO) or borate is required to active the metallocene catalyst. In a preferred embodiment, MAO is used as a co-catalyst. MAO methylates the metallocene dichloride complex and then abstracts one methyl anion to produce an active metallocene monomethyl complex. In a preferred embodiment, the active complex is zirconocene monomethyl cation.

In one embodiment, the MAO co-catalyst is prepared by controlled, partial hydrolysis of trimethylaluminum with free water or with water derived from a hydrated metal salt. Varying degrees of hydrolysis result in varying levels of unreacted trimethylaluminum. In one embodiment, the MAO contains 5-35 mol. % of the aluminum value as unreacted trimethylaluminum. Preferably, the unreacted trimethylaluminum content is less than 25 mol. % of the total aluminum value, and more preferably, less than 20 mol. %.

In one embodiment, the amount of the metallocene catalyst used in in situ polymerization of ethylene may be 0.001-0.01 wt./vol. % based on the total volume of the reaction solution or suspension, preferably 0.001-0.005 wt./vol. %, more preferably 0.002-0.003 wt./vol. %.

In an exemplary embodiment, the in situ, slurry polymerization of ethylene in a solvent may be carried out in a 250 mL round bottom flask equipped with a magnetic stirrer. The required amounts of a metallocene catalyst, solvent and graphene may be added to the flask and pre-incubated at a constant temperature of 35-55° C. for 30 minutes. After that, ethylene may be introduced into flask and ethylene is absorbed into the solvent until a saturation point is reached. After the absorption of ethylene into the solvent reaches a saturation point, the co-catalyst may be added and the reaction may take 20-40 minutes to complete. The reaction mixture may be stirred to enhance the polymerization process. Next, the polymerization may be quenched and the product (graphene-doped HDPE) may be filtered, washed then dried. All polymerization experiments may be performed at atmospheric pressure or within pressure ranges that are close to atmospheric pressure, for example, 1-2 bar (0.99-1.97 atm).

Examples of solvents in slurry polymerization of ethylene include toluene, silsesquioxane, ionic liquid and other fully or partially condensed olefins.

In an alternative embodiment, HDPE may be synthesized by gas phase polymerization of ethylene, such as the UNIPOL™ polyethylene process in a single, low-pressure, gas-phase reactor.

For purposes of the present invention, graphene refers to two-dimensional nanosheets of graphene that have not been oxidized, reduced or subject to any chemical modification prior to polymerization. In one embodiment, the graphene nanosheets have a thickness within the range of 0.30-0.50 nm, for example, 0.34 nm, and consist of single layers of carbon atoms with hexagonal lattices. Graphene is used as a doping agent or filler that is dispersed directly through the polyethylene matrix during polymerization. Graphene is not used as a carrier or support material for the catalyst. In one embodiment, the amount of graphene added to the polymerization is 0.05-0.85 wt. % based on the total weight of the HDPE produced, preferably 0.12-0.45 wt. %, more preferably 0.2-0.3 wt. %.

In one embodiment, methods disclosed herein produce HDPE nanocomposites with a molecular weight range of 30-120 kDa, preferably 50-120 kDa, more preferably 80-120 kDa, even more preferably 100-120 kDa. The incorporation of graphene is found to increase the HDPE molecular weight by up to 4 times compared to HDPE synthesized without graphene.

In another embodiment, methods disclosed herein produce HDPE nanocomposites with polydispersity index (PDI) values within the range of 3-12, preferably 4-12, more preferably 8-12, even more preferably 10-12. The incorporated of graphene has also been found to enhance the molecular weight distribution of the HDPE nanocomposites, as reflected by the PDI values.

HDPE nanocomposites produced according to methods described herein have a melting temperature of at least 120° C., preferably greater than 130° C., more preferably greater than 132° C.

HDPE nanocomposites produced according to methods in the present invention may be non-flammable, having a peak heat release rate of 600-800 W/g, preferably 600-700 W/g, more preferably 600-650 W/g. The total heat release rate of these HDPE nanocomposites is lower than 35 kJ/kg, for example, 30-33 kJ/kg, more preferably 25-30 kJ/kg. The peak decomposition temperature is no greater than 500° C., for example 450-500° C., more preferably 400-450° C.

The examples below are intended to further illustrate protocols for preparing and characterizing the various embodiments of high density polyethylene described herein, and are not intended to limit the scope of the claims.

EXAMPLE 1

Materials

All manipulations were carried out under $N_2$ environment, with standard Schlenk flask and glove box. Zirconocene (catalyst), toluene (solvent) and methylaluminoxane (MAO) co-catalyst were obtained from Aldrich Chemicals and kept in glove box (nitrogen environment) to prevent any contamination. Graphene (96-99%, 50-100 nm) was purchased from Grafen Chemical Industries Co (Turkey).

EXAMPLE 2

Synthesis of Polyethylene Nanocomposites Via In Situ Polymerization

Ethylene polymerization was carried out in a 250 mL round bottom flask equipped with a magnetic stirrer. Prior to reaction, the required amount of catalyst (6 mg), solvent (80 mL) and graphene (5, 10, 15 and 30) mg were added to the flask inside the glove box. Afterwards the reactor was immersed in a constant temperature bath at 40° C. Once the reactor and bath temperature had been equilibrated, nitrogen from the reactor was removed by a vacuum pump and ethylene was introduced. The co-catalyst was added after absorption of ethylene into toluene reached the saturation point. The reaction time was kept at 30 minutes and stirring speed was 1000 rpm, after which the polymerization was quenched by adding acidified methanol (5 vol. % HCl). The product was filtered and washed with excess amount of methanol and then kept in an oven at 50° C. All the samples were prepared under the same conditions. The weight fraction of graphene in the nanocomposites was calculated on the basis of weight of graphene added during the polymerization process. 5, 10 and 15 mg were 0.14, 0.25 and 0.41 wt. % respectively. The corresponding abbreviations used here are G1HDPE, G2HDPE, and G3HDPE for 0.14, 0.25, and 0.41 wt. % respectively. All polymerization experiments were conducted at the pressure of 1.3 bar.

EXAMPLE 3

Characterization of Polyethylene Nanocomposites

The average molecular weight of the synthesized G1/HDPE, G2/HDPE, and G3/HDPE nanocomposites was determined by triple detection high temperature gel permeation chromatography (HT GPC). The equipment was calibrated using Polystyrene standards. About 25 mg of samples were dissolved in accurately measured 10 mL 1,2,4-trichlorobenzene, in a 40 mL glass vial. The vial was sealed with Teflon coated cap and placed for 3 hours in auto sampler vortex to dissolve. The temperature was maintained at 160° C. while stirring gently.

Differential Scanning calorimetry (DSC) tests were performed using DSC-Q1000, TA instrument. The equipment was calibrated by melting characteristics of Indium. Nearly 5 mg of each sample was taken in an aluminum pan. The samples are first heated to 160° C. at a heating rate of 10° C./min, and then cooled to 30° C. at a cooling rate of 10° C./min under nitrogen flow of 50 mL/min. Two heating cycles of were carried out for each sample and data of the second heating cycle was used for analysis. All the measurements were performed for three samples of each composition to ensure the reproducibility of data.

The flammability characteristics were investigated by using FAA (Federal Aviation Administration) microcalorimeter. The flow sensors were calibrated according to the procedure described in the operation manual of equipment. Nearly 3 mg of sample was taken in sample pan and placed on probe, which led to pyrolysis chamber. Once the oxygen flow has reached a stable flow of ±0.05%, the sample was moved into the pyrolysis chamber. Inside the pyrolysis chamber the sample was heated at 1° C./min to maximum temperature of 900° C. All the calculations were carried out with the software available with FAA microcalorimeter.

Results from the characterizations of the synthesized G1/HDPE, G2/HDPE, and G3/HDPE nanocomposites, as well as HDPE as a control are summarized in Table 1 and Table 2.

TABLE 1

Molecular weight (Mw), polydispersity index (PDI) and crystalline melting temperature ($T_m$) of HDPE and G1/HDPE, G2/HDPE and G3/HDPE polyethylene nanocomposites.

| No. | Sample | Filler (mg) | Mw (Da)[b] | PDI[b] | $T_m$ ° C.[c] |
|---|---|---|---|---|---|
| 1 | HDPE | 0 | 30044.75 | 4.13 | 131.86 |
| 2 | G1/HDPE | 6 | 31513.50 | 3.17 | 132.72 |
| 3 | G2/HDPE | 10 | 119862.75 | 11.55 | 132.47 |
| 4 | G3/HDPE | 15 | 78140.50 | 8.17 | 132.61 |

[a]Polymerization conditions: solvent (Toluene) = 80 mL, Temperature = 30° C., Time = 30 min, catalyst amount = 6 mg, MAO = 5 mL, Stirrer RPM = 1000.
[b]Measured by High temperature GPC, using Tri chlorobenzene (TCB) as solvent.
[c]Measured by Differential scanning calorimetry (DSC) at 10° C./min of heating rate.

TABLE 2

Peak heat released rate (HRR), total heat release (HR) and peak decomposition temperature ($T_p$) of HDPE and G1/HDPE, G2/HDPE and G3/HDPE polyethylene nanocomposites by FAA microcalorimetry.

| No | Sample | Peak HRR (W/g) | Total HR (kJ/kg) | $T_p$ (° C.) |
|---|---|---|---|---|
| 1 | HDPE | 1039.68 ± 32.21 | 39.25 ± 3.09 | 507.21 ± 1.53 |
| 2 | G1/HDPE | 665.28 ± 18.87 | 29.18 ± 2.27 | 496.02 ± 2.55 |
| 3 | G2/HDPE | 648.16 ± 19.46 | 28.73 ± 2.34 | 89.76 ± 1.81 |
| 4 | G3/HDPE | 788.90 ± 25.59 | 33.34 ± 0.89 | 499.61 ± 1.88 |

Table 1 shows that the average molecular weight of polyethylene nanocomposites increased with the addition of graphene. The highest value of molecular weight was obtained at 10 mg of graphene, along with 6 mg of catalyst and 5 mL of co-catalyst, wherein the molecular weight was close to 4 times higher compared to polyethylene synthesized without the presence of graphene. Further increase in loading of the graphene filler decreased the molecular weight of the polyethylene-graphene nanocomposites. However, it was still significantly higher than the control (polyethylene without graphene).

The molecular weight distribution was measured by using triple detection high temperature gel permeation chromatography shown in FIG. 1. As can be seen from FIG. 1, the molecular weight distribution has also been increased with the addition of the graphene filler, which will ease the processing of the polymer. At 10 mg of graphene, the polydispersity index (PDI) value of polyethylene-graphene nanocomposites is close to 3 times higher than the PDI value of polyethylene without graphene.

The crystalline melting temperature was measured by DSC and a slight increase was noticed, as shown in Table 1.

Figure 2:
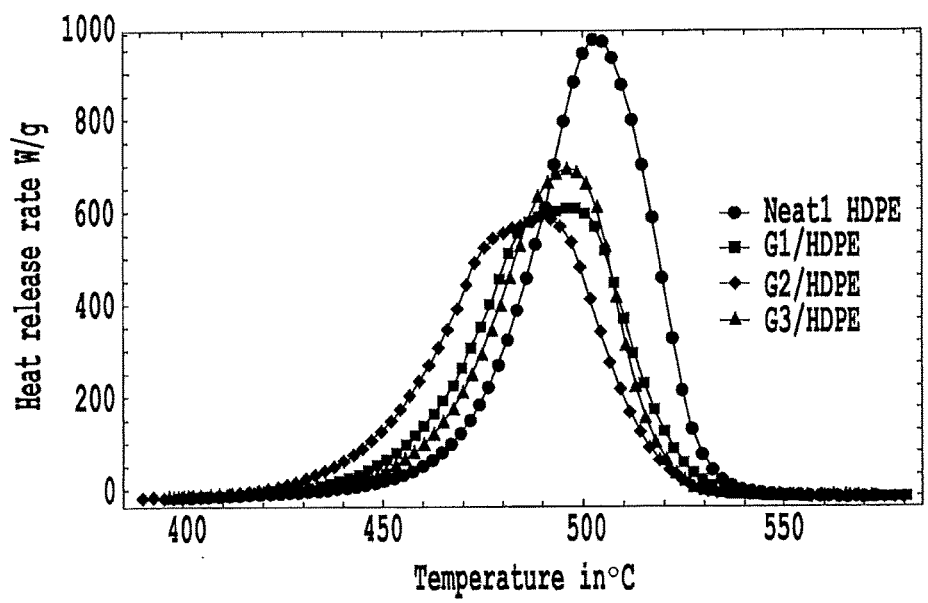
FIG. 2 is a graph illustrating the heat release rates for polyethylene nanocomposites measured via FAA microcalorimetry.

The flammability characteristics were investigated by FAA microcalorimetry. It was found that the peak heat release rate as well as the total heat released have been significantly reduced with the addition of graphene onto polyethylene. Furthermore, the peak decomposition temperature ($T_p$) was been reduced for all the three polyethylene-graphene nanocomposites synthesized in the presence of graphene. The heat released rate at progressive temperature is shown in FIG. 2.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of producing a high-density polyethylene nanocomposite, comprising:
    adding a zirconocene catalyst, toluene solvent and graphene nanosheets having a particle size of 50-100 nm to a reaction vessel to form a first mixture, wherein the zirconocene catalyst and the graphene nanosheets are in a weight ratio of from 6:10 to 6:15 based on the total amount of the zirconocene catalyst and the graphene nanosheets in the reaction vessel;
    removing nitrogen from the first mixture under vacuum and adding ethylene to the first mixture in an amount sufficient to saturate the toluene solvent with the ethylene and form a second mixture;
    adding a methylaluminoxane co-catalyst to the second mixture to form a polymerization mixture;
    polymerizing, at atmospheric pressure, the ethylene in the polymerization mixture to form a polyethylene-containing reaction mixture;
    quenching the polyethylene-containing reaction mixture by adding a methanol solution comprising HCl;
    filtering the quenched reaction mixture, washing the quenched reaction mixture with methanol and drying to form the high-density polyethylene nanocomposite in which the graphene nanosheets are dispersed in the polyethylene,
    wherein the graphene nanosheets have not been oxidized, reduced or subject to any chemical modification prior to the polymerizing.

2. The method of claim 1, wherein the polymerizing forms a high-density polyethylene nanocomposite that is non-flammable.

3. The method of claim 1, wherein the second mixture consists of the toluene solvent, the zirconocene catalyst, the graphene nanosheets and the ethylene.

4. The method of claim 1, wherein the polymerization mixture consists of the toluene solvent, the zirconocene catalyst, the graphene nanosheets, the ethylene, and the methylaluminoxane co-catalyst.

5. The method of claim 1, wherein the amount of the graphene nanosheets present during the polymerizing is 0.14-0.85 wt. % based on the total weight of the high-density polyethylene nanocomposite produced.

6. The method of claim 1, wherein the polymerizing forms a high-density polyethylene nanocomposite comprising graphene in an amount of 0.14-0.41 wt % and wherein said graphene nanofiller has a single layer thickness of 0.30-0.34 nm.

7. The method of claim 1, wherein the polymerizing fog axis a high-density polyethylene nanocomposite having a molecular weight of 30-120 kDa.

8. The method of claim 1, wherein the polymerizing forms a high-density polyethylene nanocomposite having a polydispersity index of 3-12.

9. The method of claim 1, wherein the polymerizing forms a high-density polyethylene nanocomposite, having a molecular weight of 30-120 kDa, a unimodal molecular weight distribution and a polydispersity index of 3-12.

10. The method of claim 1, wherein the polymerizing forms a high-density polyethylene nanocomposite having a total heat release of less than 33.34 kJ/kg.

11. The method of claim 1, wherein the polymerizing forms a high-density polyethylene nanocomposite having a peak heat release rate of from 788.90 to 665.28 W/g.

12. The method of claim 1, wherein the polymerizing forms a high-density polyethylene nanocomposite having a peak heat release rate of 665.28-788.9 W/g, a total heat release of 29.18-33.34 kJ/kg and a peak decomposition temperature of from 496.02 to 499.61° C.

13. The method of claim 1, wherein the polymerizing forms a high-density polyethylene nanocomposite having a weight average molecular weight of from 31,513.5 to 119,862.75 Da.

14. The method of claim 1, wherein the polymerizing forms a high-density polyethylene nanocomposite having a crystalline melting temperature of from 132.47 to 132.72° C.

* * * * *